| | FIRST DIGIT OF INSTRUCTED NUMBER | | | | | | | | | |
|---|---|---|---|---|---|---|---|---|---|---|
| | 0 | 1 | 2 | 3 | 4 | 5 | 6 | 7 | 8 | 9 |
| TEST NUMBER | 3 | 4 | 4 | 4 | 8 | 8 | 8 | 8 | 0 | 1 |
| DIRECTION SIGNAL | D | D | D | D | U | U | U | U | D | D |

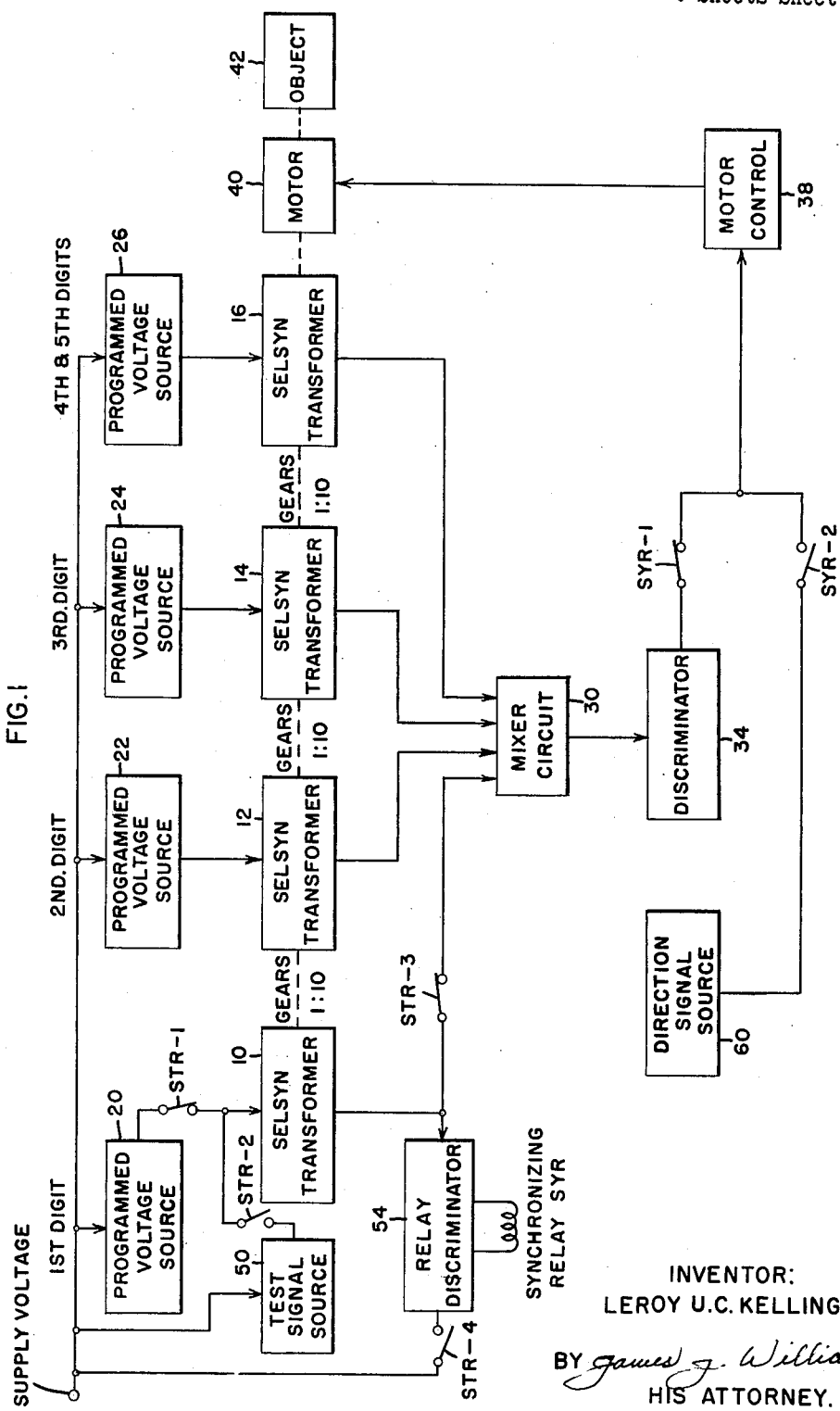

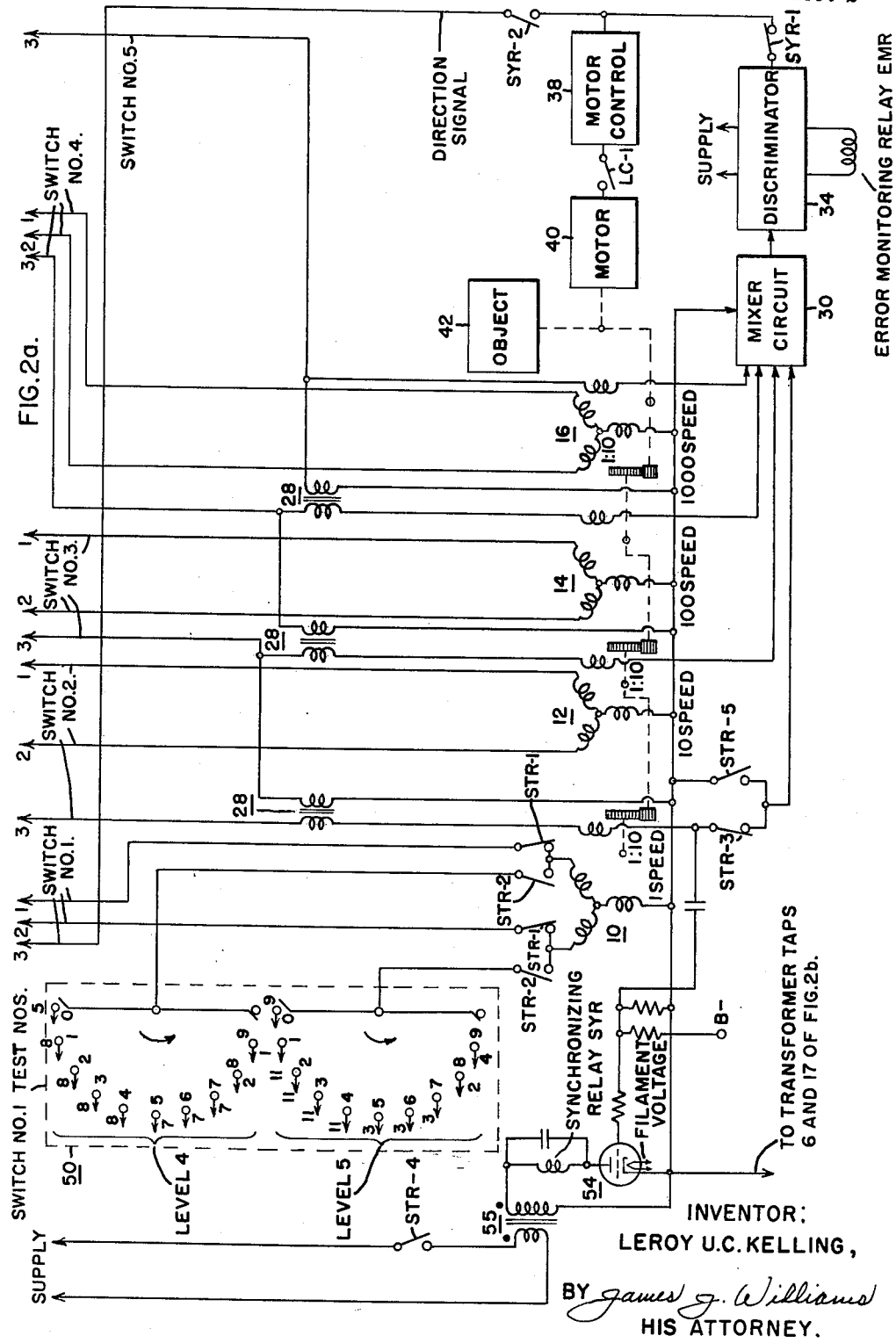

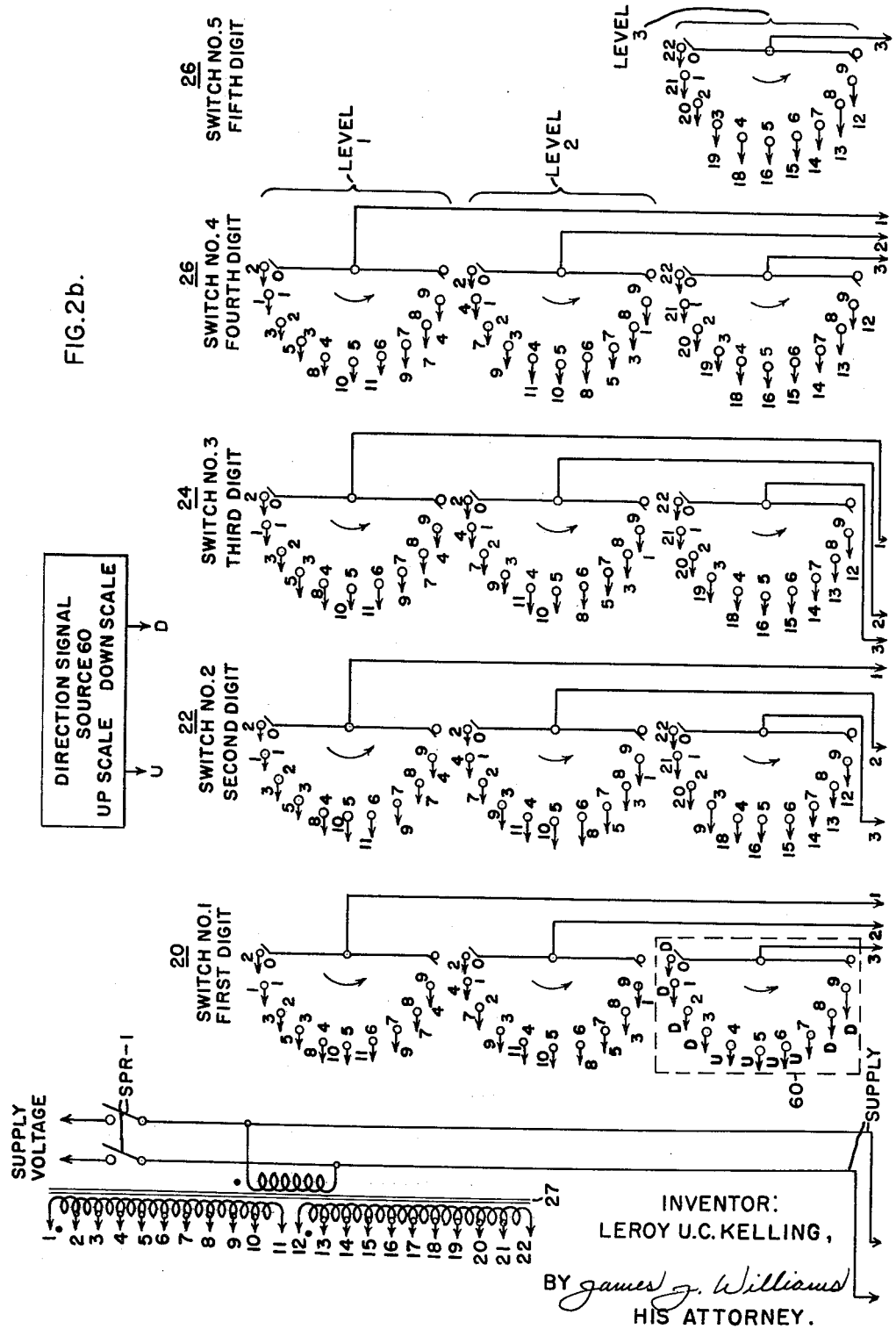

INVENTOR:
LEROY U.C. KELLING,
BY James J. Williams
HIS ATTORNEY.

EXPANDED TRAVEL RELAY DISCRIMINATOR ZONES FOR CONTINUOUS ROTATIONAL TRAVEL ILLUSTRATED FOR NUMBERS BETWEEN 3000 AND 3999.

INVENTOR:
LEROY U.C. KELLING,
BY James G. Williams
HIS ATTORNEY.

United States Patent Office 3,035,214
Patented May 15, 1962

3,035,214
POSITIONING CONTROL SYSTEM HAVING AN EXTENDED WORKING ZONE CONTROL TRANSFORMER SYNCHRO
Leroy U. C. Kelling, Waynesboro, Va., assignor to General Electric Company, a corporation of New York
Filed July 31, 1959, Ser. No. 830,874
13 Claims. (Cl. 318—28)

The invention relates to a positioning control system, and particularly to a positioning control system that has an extended working zone.

Certain prior art positioning control systems use one or more selsyn transformers to control a drive device that positions an object at a desired point in the working zone of the system. If predetermined voltages (generally provided by a single common transformer) are applied to the stator windings of the selsyn transformers, certain voltages will then appear across the rotor windings of the selsyn transformers. And, if the drive device simultaneously moves the object and the rotor windings in a direction that will place the object at the desired point, the circuit parameters can be chosen so that the voltages across the rotor windings will approach a minimum as the object approaches the desired point. The use of the rotor voltages to control the drive device in the arrangement described thus provides a positioning control system. In a positioning control system such as the one just described, unambiguous operation is limited to steps each having a range of no more than one-half of a revolution of the lowest speed rotor winding of the selsyn transformers. Thus, where one revolution of the lowest speed rotor winding of the selsyn transformers corresponds to a travel of 100 inches, the range of unambiguous operation is limited to steps that have a maximum range of 50 inches. This range is further limited by other factors. The number of predetermined voltages which can be provided for the stator windings of the selsyn transformer is limited from a practical standpoint. Consequently, interpolation voltages are derived from these predetermined voltages to increase the number of different voltages which may be provided. These interpolation voltages further limit the range to a value which is somewhat less than the 50% range provided by the lowest speed rotor winding of the selsyn transformers. And, the range is still further limited by certain gear ratios which exist between the rotor windings of the selsyn transformers. In certain positioning control systems having four selsyn transformers which provide a resolution accurate to five significant figures, the range of a step of operation may be limited to as little as 39.9% of a revolution of the lowest speed rotor winding of the selsyn transformers. Where the desired working zone of the system is greater than the range of a single step of operation, it has been necessary to perform a plurality of steps to provide the desired working zone or to provide one or more additional selsyn transformers and associated apparatus.

Accordingly, an object of the invention is to increase the working zone of certain positioning control systems.

Another object of the invention is to extend the working zone of an existing positioning control system, the extended working zone being covered in only one step.

Another object of the invention is to extend the working zone of an existing positioning control system without the addition of a selsyn transformer.

Another object of the invention is to provide an improved positioning control system.

Another object of the invention is to increase the working zone of certain positioning control systems and maintain the resolution of such systems without the addition of a selsyn transformer.

Briefly, the positioning control system of the invention contemplates a known follow-up control system having a drive device for positioning an object by steps each having a range determined by the known system. The known system may use selsyn devices to provide a predetermined signal for effecting the positioning. In accordance with the invention, a source produces a direction signal that has a selectable value and that may be coupled to the drive device. With the direction signal coupled to the drive device, the drive device positions the object from any point in the working zone to a point inside the range of the known system. Means are coupled to the drive device of the known system for first coupling the drive device to the direction signal source so as to bring the object inside the range, and then coupling the drive device to the predetermined signal source of the known system so as to position the object at the desired location inside the range. Relays and associated circuitry may be used to provide the alternative coupling means. With a system in accordance with the invention, the working zone, in which positioning is possible in one step, may be 75% of a revolution of the lowest speed rotor winding.

The invention will be better understood from the following description taken in connection with the accompanying drawing, and its scope will be pointed out in the claims. In the drawing:

FIGURE 1 shows a general block diagram of a positioning control system in accordance with the invention;

FIGURE 2(a) shows a detailed schematic diagram of the selsyn transformers and operating portions of the system shown in the block diagram of FIGURE 1;

FIGURE 2(b) shows a detailed schematic diagram of stepping switches and a transformer which provide the voltage sources of the system shown in the block diagram of FIGURE 1;

Figure 3:
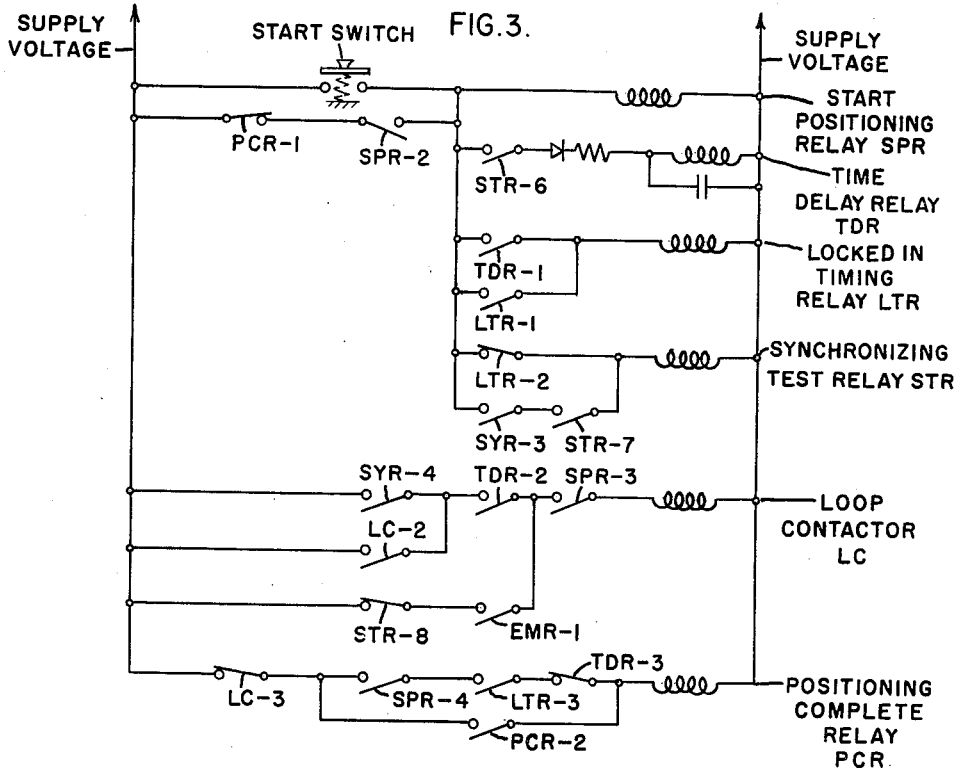
FIGURE 3 shows various relay windings, armatures, and contacts which are associated with the system of the invention.

The connections between FIGURES 2(a) and 2(b) are indicated by appropriate legends at the edges of the figures. Leads bearing the same legends are to be considered as being connected together.

*General Description and Operation*

A positioning control system having the extended working zone provided in accordance with the invention is shown in the simplified general block diagram in FIGURE 1. The system comprises a plurality of selsyn transformers 10, 12, 14, 16 each having stator windings or stators and associated rotor windings or rotors. A plurality of predetermined or programmed voltage sources 20, 22, 24, 26 are applied to the respective stators of the selsyn transformers 10, 12, 14, 16 so as to cause a certain voltage to be present across or to be induced in each of the respective rotors of the selsyn transformers 10, 12, 14, 16. The rotors of the selsyn transformers are coupled to a mixer circuit 30, such a mixer circuit being shown and described as a takeover circuit in Patent No. 2,764,720 issued to L. U. C. Kelling on September 25, 1956. The mixer circuit 30 effectively serves to select the voltages or signals presented by the rotors and their respective interpolation voltages in a sequential manner beginning with the selsyn transformer 10 which is associated with the first instructed digit and which is the lowest speed transformer, and ending with the selsyn transformer 16 which is associated with the fourth and fifth instructed digits and which is the highest speed transformer. The output signal from the mixer circuit 30 is coupled to a discriminator 34, which may be substantially the same as the discriminator shown and taught in the above-mentioned patent. The output signal from the discriminator 34 is applied to a motor control 38, which provides power of sufficient magnitude and a signal of the proper characteristics to control an electric motor 40. The motor control 38 and motor 40 are of the type also described in the above-mentioned patent. The shaft of the motor 40 is coupled to an object 42 so as to move or drive the object 42 in the manner desired, such as in a straight-line direction. The shaft of the motor 40 is also coupled (through gears if desired) to the rotor of the selsyn transformer 16 associated with the fourth and fifth digits, and the rotor of this transformer 16 is coupled through a system of gears to the rotor of the selsyn transformer 14 associated with the third digit, and so on through a system of gears to the rotor of the selsyn transformer 10 associated with the first digit. Any suitable gear ratio or ratios may be used, one preferred ratio being a 1:10 ratio between respective rotors to provide a positioning control that can be easily used with a decimal programming of digits. If the gear ratios shown in FIGURE 1 are used, and if the rotor of the selsyn transformer 10 associated with the first digit operates at a given speed (called 1-speed), the rotor of the selsyn transformer 12 associated with the second digit operates at a speed ten times the given speed (or at 10-speed). Similarly, the rotor of the selsyn transformer 14 associated with the third digit operates at a speed (100-speed) ten times the speed of the rotor of the selsyn transformer 12 of the second digit, or one hundred times the speed of the rotor of the selsyn transformer 10 associated with the first digit. And, likewise, the rotor of the selsyn transformer 16 associated with the fourth and fifth digits rotates at a speed (1000-speed) ten times the speed of the rotor associated with the third digit, or 1000 times the speed of the rotor associated with the first digit.

The positioning control system described thus far is known in the art. In its operation, also known in the art, suitable predetermined voltages are supplied by the sources 20, 22, 24, 26 to the stators of the selsyn transformers 10, 12, 14, 16 respectively, the voltages being properly selected to provide a predetermined movement of the object 42 to a certain point or position, or in a certain manner. The voltages across the respective stators of the transformers 10, 12, 14, 16 set up or induce certain voltages in the respective rotors of the transformers 10, 12, 14, 16, the amount of the voltages so set up or induced being dependent upon the position of the rotors. The voltages across or induced in the rotors and their respective interpolation voltages are applied to the mixer circuit 30, and as mentioned, are then sequentially coupled through the discriminator 34 to the motor control 38, which causes the motor 40 to perform some function or to rotate in a certain direction. As the motor 40 rotates, the rotors of the transformers 10, 12, 14, 16 also rotate, and if the system is properly operating, the rotors will be rotated to a position where a minimum or no voltage is presented to each of the input circuits of the mixer circuit 30. Under normal conditions, this position of the rotors will be reached at the same time the object is moved to its desired point or position. Consequently, no further voltages are applied to the mixer circuit 30, and the motor 40 ceases to operate. When a new position of the object 42 is desired, new voltages are applied to the stators of the selsyn transformers 10, 12, 14, 16 from the sources 20, 22, 24, 26 and the operation repeats itself until the object 42 and the rotors are at the proper position.

As previously mentioned, there are a number of various factors present in a positioning control system such as just described which may limit, from a practical standpoint, the range of each step of the system to as little as 39.9% of a revolution of the lowest speed or 1-speed rotor, that is the rotor of the selsyn transformer 10 associated with the first digit. In accordance with the invention, the system may be provided with an extended working zone of 75% of a revolution of the lowest or 1-speed rotor, it being possible to position an object anywhere in this extended zone in a single step. Positioning outside of this extended zone is also possible in smaller steps. In accordance with the invention, a test signal source 50 is provided, this source 50 supplying certain predetermined test signals or voltages in accordance with the position or point at which the object 42 is to be located. Signals or voltages from the test signal source 50 are alternatively and selectively applied to the stators of the selsyn transformer 10 associated with the first digit through an armature and contacts STR-2 associated with a synchronizing test relay winding STR (not shown in FIGURE 1). Thus, when the system is to effect movement to a new position, the synchronizing test relay winding STR is energized and the stators of the selsyn transformer 10 are switched from the voltage source 20 to the test signal source 50 by means of the contacts STR-1 and STR-2. At the same time, contacts STR-3 open the circuit between the selsyn transformer 10 and the mixer circuit 30 and contacts STR-4 supply a relay discriminator circuit 54 with a suitable supply voltage. If the called-for position and the actual position of the object are separated by a distance greater than the range of one step of the system (e.g., more than 39.9% of a revolution of the lowest speed rotor winding of the system mentioned), the signal from the test signal source 50 induces a signal in the rotor of the selsyn transformer 10 that exceeds a predetermined magnitude and the relay discriminator 54 energizes a synchronizing relay winding SYR. Upon energization of the synchronizing relay winding SYR, contacts SYR-1 associated with the synchronizing relay winding SYR break the circuit between the discriminator 34 and the motor control 38. Simultaneously contacts SYR-2 close the circuit between a direction signal source 60 and the motor control 38. The direction signal source 60 supplies one of two signals to cause the motor 40 to operate in the direction needed to move the object 42 toward the desired position or point, and to move the rotors of the selsyn transformers 10, 12, 14, 16 toward the position of minimum or no voltage. As the rotor of the lowest speed (1-speed) selsyn transformer 10 associated with the first digit approaches its desired position (that is, comes to a position that is within 39.9% of a revolution from the position of minimum voltage), the voltage induced in this rotor by the test signal source 50 diminishes to a point where it is below the previously mentioned predetermined magnitude. When this occurs, the relay discriminator 54 no longer energizes the synchronizing relay winding SYR. Hence the contacts SYR-1 and SYR-2 resume their normal positions so that the motor control 38 is connected to the discriminator 34 and is no longer connected to the direction signal source 60. As will be hereinafter explained, when the synchronizing relay winding SYR is deenergized, the the synchronizing test relay winding STR is likewise deenergized so that the lowest or 1-speed selsyn transformer 10 associated with the first digit is again connected to the programmed voltage source 20 through the contacts STR-1 and is disconnected from the test signal source 50 by the contacts STR-2. Also, the mixer circuit 30 is again connected to the selsyn transformer 10 through the contacts STR-3. When the system has reached this stage of operation, the motor 40 operates in accordance with the signals provided by the voltage sources 20, 22, 24, 26 until the rotors are at the point where a minimum or no voltage is presented to the mixer circuit 30, at which point the object 42 will also be at its desired point or position. Thus, the invention, in effect, provides a source of signals which is utilized under predetermined conditions to operate the motor 40 until the object 42 and the rotors of the selsyn transformers 10, 12, 14, 16 are within their range of unambiguous operation. Once this range is reached, the system operates in the manner of prior art positioning control systems.

Detailed Circuit Description

The system in accordance with the invention which was described generally in connection with FIGURE 1 will be described in greater detail in connection with FIGURES 2(a) and 2(b). In FIGURES 1, 2(a) and 2(b), the same reference numerals refer to the same elements. Also in the various figures, the contacts associated with a particular relay winding bear the same legend as the winding but are followed by a numerical suffix. FIGURE 2(a) shows the selsyn transformers 10, 12, 14, 16, the mixer circuit 30, the discriminator 34, the motor control 38, the motor 40, the object 42, the relay discriminator circuit 54, and other operating portions of the system. FIGURE 2(b) shows the voltage sources 20, 22, 24, 26 and the direction signal source 60.

With reference to FIGURE 2(a), the selsyn transformers 10, 12, 14, 16 each comprises three stators and a rotor. The rotor of each of the transformers 10, 12, 14, 16 is connected to the rotor of the next higher speed transformer through a gearing arrangement having a ratio of 1:10 as shown. The stator windings or stators of the respective selsyn transformers 10, 12, 14, 16 are connected in a Y-network. Two of the stators of each of the selsyn transformers 10, 12, 14, 16 are coupled to levels 1 and 2 of switch numbers 1, 2, 3, and 4 respectively. The third stator of each of the selsyn transformers 10, 12, 14, 16 is coupled to a bus which is at some point of reference potential, such as ground. The respective rotors of the selsyn transformers 10, 12, 14, 16 have one end coupled through interpolation transformers 28 to level 3 of switch numbers 2, 3, 4, and 5 respectively, and have the other end coupled to the mixer circuit 30. The two stators of the lowest or 1-speed selsyn transformer 10 are respectively coupled to levels 1 and 2 of switch number 1 through the normally engaged contacts STR-1. The two stators of the lowest or 1-speed selsyn transformer 10 may be respectively coupled to the test signal source 50 of switch number 1 through the normally disengaged contacts STR-2. Likewise, one end of the rotor of the 1-speed selsyn transformer 10 is coupled to the mixer circuit 30 through the normally engaged contacts STR-3. This rotor is also coupled to the relay discriminator 54 which comprises a suitable electron discharge device such as the triode vacuum tube shown. A resistor and capacitor are serially connected between the grid electrode of the selectron device and this rotor. The grid electrode is normally biased by some suitable source of unidirectional or direct current potential B— that is negative with respect to the reference potential so that some predetermined amount of voltage must be applied to the grid electrode before the electron device of the relay discriminator 54 can conduct. The anode of the electron device is coupled through the synchronizing relay winding SYR to a suitable source of potential provided by the secondary winding of a relay discriminator transformer 55. The electron device is conventionally connected in the manner shown. The primary of the relay discriminator transformer 55 is supplied from a suitable source of alternating current potential when the contacts STR-4 are engaged in response to energization of the synchronizing test relay winding STR. The particular input circuit of the mixer circuit 30 to which the voltage of the rotor of the 1-speed selsyn transformer 10 is applied may be coupled to the point of reference potential through the normally disengaged contacts STR-5. The output circuit of the mixer circuit 30 is coupled to the discriminator 34, and the output circuit of the discriminator 34 is normally coupled to the motor control 38 through the normally closed contacts SYR-1. The discriminator 34 also includes an error monitoring relay winding EMR which remains energized as long as the mixer circuit 30 applies a signal to the discriminator 34, and which is deenergized in the absence of a signal from the mixer circuit 30. The motor control 38 may be supplied with a signal from the direction signal source 60 when the contacts SYR-2 are engaged. The motor control 38 is coupled to the motor 40 through contacts LC-1 which are normally disengaged, but which become engaged in response to energization of a loop contactor winding LC. The motor 40 is mechanically connected by suitable means, which may include gears or other mechanical devices, to the object 42 and to the rotor of the 1000-speed selsyn transformer 16 associated with the fourth and fifth digits. And, as already mentioned, the rotors of the respective selsyn transformers 10, 12, 14, 16 are mechanically coupled together through suitable gearing arrangements each having a predetermined speed step-down ratio of 10:1 in a direction from the highest speed (1000-speed) selsyn transformer 16 to the lowest speed (1-speed) selsyn transformer 10 so as to provide the speed ratios and relationships explained in the general description and operation.

The programed voltage sources 20, 22, 24, 26 are shown in detail in FIGURES 2(a) and 2(b). These voltage sources may comprise a plurality of stepping switches, the switch numbers corresponding to the respective digits of the instructed number. Each switch has one or more levels. Each level includes an arm which rotates and engages one of a plurality of contacts which represent digits from zero to nine as indicated by the numbers on the inner side of the contacts. The switch contacts are connected to the taps of the secondary winding of a supply voltage transformer 27 in the manner indicated by the numbers adjacent the arrows. The voltages on the switch contacts are transferred to the engaging switch arms which are connected to the respective stators and rotors as indicated by the legends at the edges of FIGURES 2(a) and 2(b). The arms of the various levels of the stepping switches may be rotated to any predetermined position in accordance with programed data which, for example, may be recorded on a magnetic tape or on punched cards in accordance with the instructed digits. In FIGURES 2(a) and 2(b), all of the arms of the various switches are shown in their home position. The arms rotate from their home position in a counterclockwise direction and engage the particular contact corresponding to the instructed digit. For example, if the first digit of some instructed number were three, all of the arms of switch number 1 would rotate counterclockwise from the home position shown to the contacts having the number 3 by them, this being the fourth contact, since the first contact corresponds to an instructed number of zero. Thus, for an instructed number whose first digit is three, the arm associated with level 1 of switch number 1 would engage the contact connected to the fifth transformer tap, the arm associated with level 2 of switch number 1 would engage the contact connected to the ninth transformer tap, the arm associated with level 3 of switch number 1 would engage the contact connected to a downscale direction signal, the arm associated with level 4 of switch number 1, shown in FIGURE 2(a), would engage the contact connected to the eighth transformer tap, and the arm associated with level 5 of switch number 1, also shown in FIGURE 2(a), would engage the contact connected to the eleventh transformer tap.

The secondary winding of the supply voltage transformer 27 is divided into two sections, one section having taps numbered 1 through 11, and the other section having taps numbered 12 through 22. Thus, each of the two sections provides ten incremental voltages which can be applied to the contacts of the various switches. In FIGURE 2(b), it will be seen that the contacts of levels 1 and 2 of the switches are connected to the taps of the one section of the supply voltage transformer 27, and that the contacts of level 3 of switch numbers 2, 3, 4, and 5 are connected to the taps of the other section of the supply voltage transformer 27. The test signal source 50 shown in FIGURE 2(a) also has its switch contacts connected to the one section of the supply voltage transformer 27. Voltages applied to levels 1 and 2 of the switches provide positioning to a resolution of 36°, and voltages applied to level 3 of the switches provide positioning to a resolution of 3.6°. Levels 1 and 2 are coupled to the stators of the selsyn transformers 10, 12, 14, 16 and level 3 is coupled to the rotors of the selsyn transformers 10, 12, 14, 16. Voltages applied to level 3 of the switches also provide positioning resolution to 0.36°, these voltages being coupled to the rotors of the selsyn transformers 10, 12, 14 through the interpolation transformers 28. These transformers have a voltage step-down ratio of ten to one in the direction of the lower switch numbers, or a voltage step-up ratio of one to ten in the direction of the higher switch numbers. Thus, the voltage from level 3 of switch number 3 for the rotor of the 10-speed selsyn transformer 12 is stepped down and also applied to the rotor of the 1-speed selsyn transformer 10 through the interpolation transformer 28. The supply voltage transformer 27 and the relay discriminator transformer 55 are supplied with a suitable energizing potential when the contacts SPR–1 engage as a result of a start positioning relay winding SPR becoming energized. A suitable energizing potential is 115 volts, 60 cycles, alternating current. A direction signal source 60 provides both positive and negative direct current voltages which may be connected to level 3 of switch number 1 in the manner indicated for certain operations to be explained. These positive and negative voltages are used to operate the motor 40 in a forward or backward direction so as to move the object 42 toward the desired point or position. The test signal source 50, shown in FIGURE 2(a) as levels 4 and 5 of switch number 1, also derives its voltages from taps on the secondary winding of the supply voltage transformer 27.

Relay Operation

Figure 4:
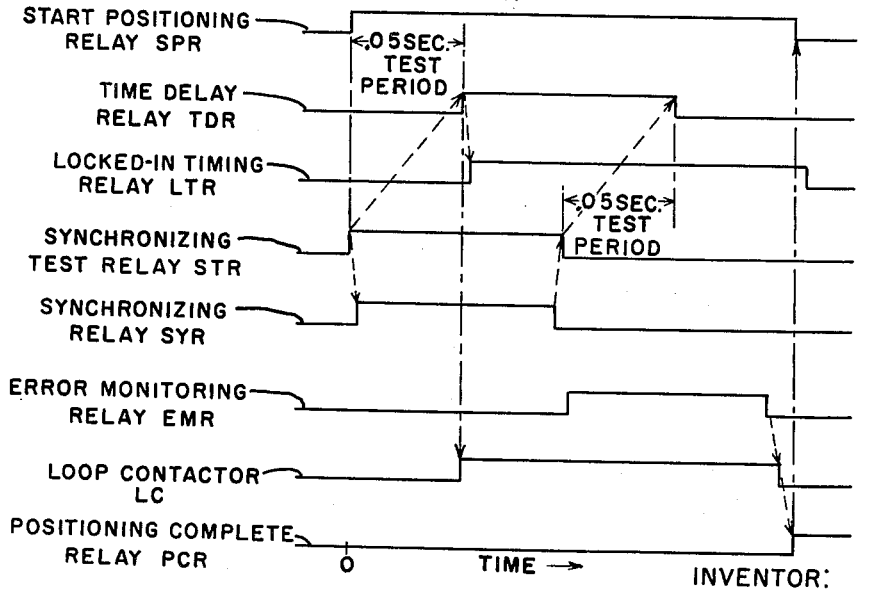
FIGURE 4 shows waveforms explaining the operation and sequence of operations of the relays which are associated with the system of the invention.

The diagrams of FIGURES 1, 2(a) and 2(b) all show the relay contacts in their normal or dropped out condition, this condition being present when the respective relay windings are deenergized. FIGURE 3 shows additional relay windings and contacts which are not shown in FIGURES 2(a) and 2(b) and which are utilized in accordance with the invention. The relay windings of FIGURE 3 are shown in their normal or dropped out condition, and hence the contacts are also in their normal or dropped out condition. The relays are energized with a suitable source of energizing potential such as 115 volts, 60 cycles alternating current. A start positioning relay winding SPR is connected across this supply voltage through a start switch. This start switch is arranged so that it is only momentarily closed, either in response to a manual or an automatic operation, and so that it subsequently opens. A time delay relay winding TDR, a locked-in timing relay winding LTR, a synchronizing test relay winding STR, a loop contactor winding LC, and a positioning complete relay winding PCR are connected to one side of the supply voltage source. Each of the windings is connected to the other side of the supply voltage source through various combinations of normally engaged and/or disengaged contacts, the contacts being identified by legends which associate them with their respective windings. A circuit including a diode and resistor connected in series with the time delay relay winding TDR and a capacitor connected in parallel with the time delay relay winding TDR is provided to delay energization and deenergization of the time delay relay winding TDR, the delay depending upon the values of the resistor and capacitor. Two windings not shown in FIGURE 3, namely, the error monitoring relay winding EMR and the synchronizing relay winding SYR, are shown in FIGURE 2(a). In all of the figures, the respective contacts associated with a winding bear the same legend as the winding but are followed by a number. FIGURE 4 shows waveforms illustrating the operation of the various relays with respect to time. In each of the waveforms in FIGURE 4, the energized condition of the winding is indicated by the upper portion of the respective waveform, and the deenergized condition of the relay winding is indicated by the lower portion of the respective waveform. Where a relay becomes energized in response to energization of another relay at some earlier time, the operation of the later operating relay is indicated by an arrowhead on a dashed line. Thus, energization of the synchronizing test relay winding STR causes energization of the synchronizing relay winding SYR. Similarly, deenergization of the synchronizing test relay winding STR causes, after a predetermined time delay, deenergization of the time delay relay winding TDR.

The following explanation of the relay operation and sequence of operation can be more readily understood by reference to the waveforms shown in FIGURE 4. Beginning at some arbitrary time zero, all of the relay windings are in the deenergized condition. It is assumed that the voltage sources 20, 22, 24, 26, the direction signal source 60, and the test signal source 50 shown in FIGURES 2(a) and 2(b) have been set up to provide the predetermined voltages needed to cause the object 42 to move to its desired position. These voltages can be set either manually or by means of some data reading device such as a perforated tape. Closing of the start switch accomplishes the following functions in the following approximate time sequence:

(1) The start positioning relay winding SPR is energized and locked in through the contacts SPR–2 and the normally engaged contacts PCR–1. Power is applied to the system through the contacts SPR–1.

(2) The synchronizing test relay winding STR is energized through the normally engaged contacts LTR–2 and accomplishes the following functions:

(A) Applies power to the relay discriminator transformer 55 of the relay discriminator 54 through the contacts STR–4.

(B) Switches the 1-speed selsyn transformer from the regular instructing digits to the alternate test digits through the contacts STR–1 and STR–2.

(C) Disconnects the rotor of the 1-speed selsyn transformer 10 from the mixer circuit 30 by means of the contacts STR–3, and connects the reference potential bus to the mixer circuit 30 through the contacts STR–5.

(D) Starts the time delay pickup interval of the time delay relay winding TDR through the contacts STR–6.

(3) After a suitable time delay interval, assumed to be 50 milliseconds in FIGURE 4, the time delay relay winding TDR is energized and accomplishes the following functions:

(A) Energizes, through the contacts TDR–1, the locked-in timing relay winding LTR which locks itself in through the contacts LTR–1.

(B) Deenergizes the synchronizing test relay winding

STR (by means of the contacts LTR-2) unless the synchronizing relay winding SYR has become energized in the meantime so that the contacts SYR-3 are engaged. The contacts STR-7 are engaged at this point. If the called-for position is outside the range of the programed voltage sources 20, 22, 24, 26, the synchronizing relay winding SYR in the relay discriminator circuit 54 becomes energized, and operation continues from this point.

(4) If the synchronizing relay winding SYR becomes energized, the following functions are performed:

(A) The synchronizing test relay winding STR is locked in through the contacts SYR-3 and STR-7.

(B) A direction signal from the source 60 is supplied from level 3 of switch number 1 to the motor control 38 through the contacts SYR-2.

(C) The discriminator 34 is disconnected from the motor control 38 by means of the contacts SYR-1.

(5) With the synchronizing relay winding SYR, the time delay relay winding TDR, and the start positioning relay winding SPR all energized, the loop contactor winding LC becomes energized through the contacts SYR-4, TDR-2, and SPR-3. The loop contactor winding LC is locked in through the contacts LC-2 and thereby connects the motor control 38 to the motor 40 through the contacts LC-1.

(6) The motor 40 runs in the desired direction called for by the direction signal source 60 until it brings the object 42 within the range of control of the voltage sources 20, 22, 24, 26. At this point, the magnitude of test signal present in the rotor of the 1-speed selsyn transformer 10 has been reduced to a point where the synchronizing relay winding SYR becomes deenergized. Deenergization of the synchronizing relay winding SYR performs the following functions:

(A) Deenergizes the synchronizing test relay winding STR by means of the contacts SYR-3.

(B) Switches the motor control 38 from the direction signal source 60 to the discriminator 34 through the contacts SYR-1 and SYR-2.

(C) Opens the initiating circuit for the loop contactor winding LC by means of the contacts SYR-4.

(7) When the synchronizing test relay winding STR is deenergized, it initiates the following functions:

(A) Removes the supply voltage from the relay discriminator transformer 55 by means of the contacts STR-4.

(B) Switches the excitation of the stators of the 1-speed selsyn transformer 10 from the test signal source 50 to the programed voltage source 20 through the contacts STR-1 and STR-2.

(C) Couples the rotor of the 1-speed selsyn transformer 10 to the mixer circuit 30 through the contacts STR-3, and removes the reference potential bus from the mixer circuit 30 by means of the contacts STR-5.

(D) Initiates the deenergization timing interval, assumed to be 50 milliseconds in FIGURE 4, of the time delay relay winding TDR by means of the contacts STR-6.

(8) If it is assumed that the object is still some distance (but within the range of operation of the voltage sources 20, 22, 24, 26) from its desired position, the rotors and interpolation transformers 28 of the selsyn transformers 10, 12, 14, 16 apply voltages to the mixer circut 30, which in turn supplies a signal to the discriminator 34. As long as a signal is supplied to the discriminator 34, the error monitoring relay winding EMR is energized. With the error monitoring relay winding EMR energized, and with the synchronizing test relay winding STR deenergized, the following functions are accomplished:

(A) The loop contactor winding LC remains energized through the contacts STR-8, the contacts EMR-1, and the contacts SPR-3 even though the time delay relay winding TDR is deenergized.

(B) The motor 40 continues to drive the object 42 towards its desired position.

(9) When the object reaches its desired position, no further signals are applied to the discriminator 34 with the result that the error monitoring relay winding EMR becomes deenergized. Upon deenergization of the error monitoring relay winding EMR, the following is accomplished:

(A) The loop contactor winding LC is deenergized by means of the contacts EMR-1, and disconnects the motor control 38 from the motor 40 by means of the contacts LC-1.

(B) Deenergization of the loop contactor winding LC completes the circuit to the positioning complete relay winding PCR through the engaged contacts LC-3, SPR-4, LTR-3, and TDR-3. Energization of the positioning complete relay winding PCR may be used to return all relay windings to their normal condition, to provide an indication that positioning is complete, and may be used to initiate another positioning operation.

If, at step number 3 above, the object 42 was within the range of the selsyn transformers 10, 12, 14, 16 (that is, the position of the object 42 and the rotor of the selsyn transformer 10 are such that the voltage supplied by the test signal source 50 is of insufficient magnitude to cause energization of the synchronizing relay winding SYR but are such as to cause energization of the error monitoring relay winding EMR), then during the period that the time delay relay winding TDR is energized, the loop contactor winding LC will become energized through the contacts STR-8, EMR-1, and SPR-3, and positioning will be in the same condition as step 8 above. From this condition, the positioning will continue in a manner substantially similar through the remainder of the operations.

If, after one positioning cycle, a new instruction is applied to the system that duplicates the last previous instruction, then the system will first check for a large error while the time delay relay winding TDR is energized, and also for a small error of positioning while the time delay relay winding TDR is still energized. The loop contactor winding LC will not become energized because the synchronizing relay winding SYR and the error monitoring relay winding EMR do not become energized. Consequently, the positioning complete relay winding PCR becomes energized as soon as the time delay relay winding TDR is deenergized and indicates that the positioning cycle is complete and that the system is ready to receive additional instructions.

*Positioning Operation*

Figures 5, 6:
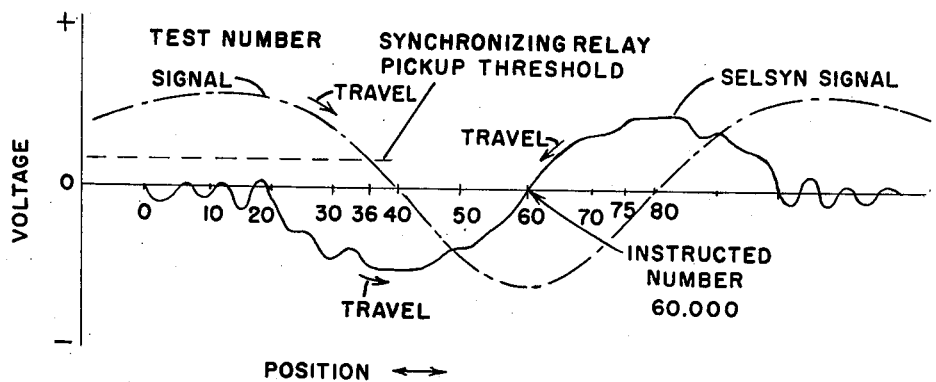
FIGURE 5 shows a table of test numbers which are provided by the test signal source of the system for providing the extended working zone.
FIGURE 6 shows waveforms for explaining the operation of the system and its extended working zone.

The system in accordance with the invention permits unambiguous positioning of an object at any point within a working zone equivalent to approximately 75% of a revolution of the lowest speed selsyn transformer. Thus, if the lowest speed selsyn transformer (which in FIGURE 2(a) would be the 1-speed selsyn transformer 10) of a positioning system has a range of 100 inches for one complete rotation or revolution, then a positioning system in accordance with the invention permits unambiguous positioning in one step between any two points in a free working zone of 75.0 inches. Positioning outside this working zone is also possible with one or more smaller steps each having a range substantially equivalent to 10% of a revolution of the lowest speed selsyn transformer. FIGURE 5 shows a table of test numbers and direction signals for each of the first digits of instructed numbers for a positioning control system in accordance with the invention that has a working zone of 0.0 to 75.0 inches. As an example of operation, it has been assumed that the position called for is 60.000 inches. Under the digit 6 of FIGURE 5 it is seen that the test number for such a position is 8 and the direction of travel is up (indicated by the letter U, as opposed to the letter D for a down direction). FIGURE 6 shows voltage waveforms representative of the test number signal and the selsyn transformer signal across the rotors, after being combined in the mixer circuit 30, as plotted against the position or location of the object 42 for the particular example assumed. Thus, the selsyn transformer signal across the rotors has a minimum or zero value at the position of the instructed number, namely 60.000 inches, and the test number signal across the rotor of the 1-speed selsyn transformer 10 has a minimum or zero value at the position or location called for by the table shown in FIGURE 5, namely 80.000 inches. If the object is at a location outside the range of one step of unambiguous operation of the selsyn signal, the test number signal across the rotor has sufficient magnitude to cause energization of the synchronizing relay winding SYR which causes the motor 40 to move the object 42 upscale as indicated by the arrow adjacent the test number signal. As the object 42 is moved in the upscale direction, the test number signal amplitude across the rotor decreases until it falls below a predetermined level (indicated in FIGURE 6 as the synchronizing relay pickup threshold). At this point, the synchronizing relay winding SYR is deenergized and the error monitoring relay winding EMR in the discriminator 34 takes over and completes the positioning to the previously instructed number of 60.000 inches. If, in the example assumed, the previous positioning left the object 42 within the range of one step of the selsyn signal positioning (that is, between 20.000 inches and 75.000 inches), then the selsyn transformers 10, 12, 14, 16 can provide the proper positioning without the use of the test number signal and the synchronizing relay winding SYR. As a practical matter, the relay discriminator 54 will cause operation or energization of the synchronizing relay winding SYR at any point between 0.0 inch and approximately 36.00 inches because the test number signal has an amplitude across the rotor sufficiently large to overcome the bias on the grid electrode of the electron device of the discriminator 54 and cause the synchronizing relay winding SYR to be energized. While the selsyn transformers 10, 12, 14, 16 are capable of bringing about the proper positioning between 20.000 inches and 75.000 inches for the particular example assumed, the selsyn transformers 10, 12, 14, 16 clearly cannot bring about proper positioning in a single step if the object 42 was previously left somewhere in the range between 0.0 inch and 20.000 inches. This is because the selsyn transformer signal oscillates or fluctuates considerably as shown in FIGURE 6, with the result that ambiguous positioning might be brought about. If the object 42 is at some point in the range between 0.0 inch and 36.000 inches the synchronizing relay winding SYR is energized and causes movement of the object 42 in the upscale direction as indicated. However, once the test number signal amplitude across the rotor falls below a predetermined level (indicated in FIGURE 6 as the synchronizing relay pickup threshold), the synchronizing relay winding SYR is deenergized and the error monitoring relay winding EMR in the discriminator 34 takes over and completes the positioning to the instructed number of 60.000 inches. While FIGURE 6 shows only one example of the waveforms for a particular instructed number, persons skilled in the art will realize that for a different instructed number the waveforms occupy different positions. For example, if the instructed number is 00.100 inch, the selsyn signal has a minimum or zero value at that point. And, examination of FIGURE 5 shows that for an instructed number of 00.100 inch, the test number is 3 and travel is in the downscale direction. Thus, the test number signal (which in FIGURE 6 is shown as having a minimum or zero value at 80.000 inches) would be moved to the left so that it has a minimum or zero value at 30.100 inches. The selsyn signal would have a minimum or zero value at the instructed number, namely 00.100 inch. Positioning from various points in the working zone would be brought about either by the selsyn transformers 10, 12, 14, 16 alone, or by the test signal and the discriminator 54 operating with the selsyn transformers 10, 12, 14, 16.

FIGURE 5 also shows alternate test numbers for instructed numbers having first digits beginning with 8 and 9, these first digits being outside of the free working zone between 00.00 and 75.00 inches. It is not always possible to position an object from a point within to a point outside of the free working zone in one step. In fact, positioning outside the free working zone may be limited to a range of 10% of a revolution of the lowest speed rotor. Hence, it may be necessary to position the object near the appropriate edge of the free working zone and then provide the selsyn transformers with one or more appropriate instructions for positioning outside of the free working zone. Since positioning outside the free working zone may be limited to a range of 10%, the number of instruction numbers depends upon the distance between the desired point and the appropriate edge of the free working zone. As an example, assume that the last positioning operation left the object at 40.00 inches in the free working zone, and that it is desired to position the object at 80.00 inches, a location just outside of the free working zone. The first step in bringing this positioning about is to move the object to a point just within the free working zone at the edge nearest the desired position, namely 80.00 inches. This is done by providing an instructed number of 75.00 inches and allowing the object to be positioned at this location in the manner described previously. Then, the system is given the instruction number for the desired position outside of the free working zone, namely 80.00 inches. An examination of FIGURE 5 will show that for this number, the alternate test number is 00.00 inch and travel is in the downscale direction. However in this situation, the selsyn signal will have a minimum at 80.00 inches, and will bring the desired positioning about because the object will not be in the area of the test number signal in which the synchronizing relay SYR is energized. Consequently, positioning will be brought about only by the selsyn signal. The alternate test number signal would have no function in this particular positioning situation. However, the test numbers are given in FIGURE 5 to show the functions which the arrangement in accordance with the invention will perform under these circumstances.

Up to this point, the operation and positioning of the system in accordance with the invention has been described primarily in terms of a linear or straight-line travel. However, it is important to note that the system in accordance with the invention can be used equally well in a rotational positioning system. Furthermore, this rotational positioning system can be used in a prescribed free working zone just as the straight-line positioning system previously described and also in continuous rotational positioning in which the free working zone travels or moves along with the rotational positioning so that the restriction of small steps (described in connection with the straight-line positioning system) is not present. In arrangements in which continuous rotational positioning is possible and desirable, there are four possible modes of operation. These four modes are:

(1) Travel in a downscale direction by the discriminator signal.
(2) Travel in the upscale direction by the discriminator signal.
(3) Upscale direction of travel favored.
(4) Downscale direction of travel favored.

In these four modes of operation, it is necessary to divide one revolution of the lowest speed selsyn transformer motion into 1,000; 10,000; 100,000 parts, or some multiple thereof. In these four modes, control of the system will go directly from one instructed number to any other instructed number although the control will frequently go around in a longer direction (that is, in the direction in which it would travel more than 180° of a revolution) of the lowest speed selsyn transformer. Examples of the four modes of continuous rotational travel are shown by the waveforms in FIGURE 7, and are described below.

Several relatively minor modifications would have to be made in the diagram shown in FIGURE 2(a) to accommodate the first two modes of operation, namely downscale and upscale travel by the discriminator 34. First, the normally open contacts SYR-2 of the synchronizing relay SYR would be disconnected from level 3 (the direction signal source 60) of switch number 1. Second, additional contacts SYR-5 and SYR-6 would be added to the synchronizing relay SYR. Third, contacts SYR-5 would be normally open and would be placed in parallel with contacts STR-3 of the synchronizing test relay STR. Fourth, contacts SYR-6 would be normally closed and would be placed in series with contacts STR-5. Fifth, a direct connection would be made across contacts SYR-1. And finally sixth, the test signal source 50 would be modified to provide a test number (sometimes referred to herein as an alternate test number) which has a value determined by which of the two modes of operation is to be used. These modifications remove the direction signal source 60 (as previously described) from the system and permit the test signals to be applied to the mixer circuit 30, the discriminator 34, and the motor control 38 during the time that the synchronizing relay SYR is energized. It will be recalled that the synchronizing relay SYR is energized if the test signals have a magnitude which exceeds some predetermined value. The actual path for applying these test signals to the mixer circuit 30 would include the closed contacts STR-2, the stator and rotor of the 1-speed selsyn transformer 10, and the closed contacts SYR-5 in parallel with the open contacts STR-3. The reference potential bus connection provided by the closed contacts STR-5 would be removed by the open contacts SYR-6. In this way positioning may be provided by test numbers which operate through the mixer circuit 30 and the discriminator 34. As the desired position is approached, the synchronizing relay SYR will eventually become deenergized (as in the previous description) and final positioning would be provided by the regular selsyn transformer signals operating through the mixer circuit 30 and the discriminator 34.

Figure 7:
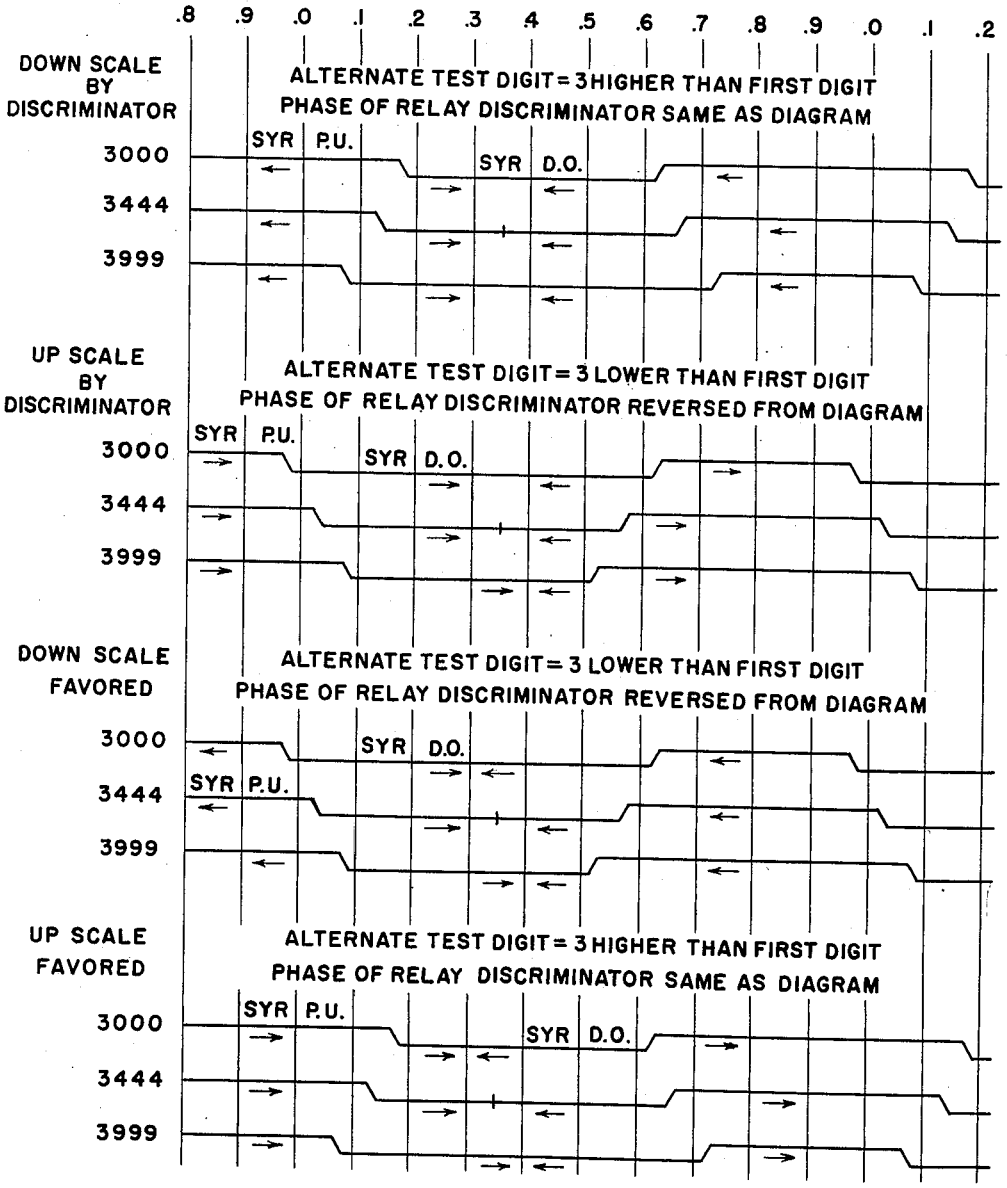
FIGURE 7 shows waveforms illustrating four modes of operation of a rotational positioning control system in accordance with the invention.

In the first mode of operation, namely travel in a downscale direction by the discriminator signal, directional signals are not required from level 3 of the stepping switches since the discriminator signal is at all times provided with the proper downscale polarity. The test signal source 50 is modified to provide an alternate test number which is always three greater than the first digit of the instructed number. The phase of the relay descriminator 54 anode voltage is given in the legend of FIGURE 7. In FIGURE 7, P.U. means picked up or energized and D.O. means dropped out or deenergized. In operation, the system prefers to travel in the downscale direction (indicated by arrows pointing to the left), unless the desired position in the upscale direction is less than one-eighth to one-third part of a revolution of the lowest speed selsyn transformer. Thus, the maximum possible upscale travel, (indicated by arrows pointing to the right) varies from approximately one- eithth part of a revolution for numbers whose last digits (that is, after the first digit) are all zeros to approximately one-third of a revolution for numbers whose last digits are all nine.

In the operation described as travel in the upscale direction by the discriminator signal, directional signals are likewise not required from level 3 of the stepping switch since the discriminator signal is always provided with the proper polarity. In this operation, the test signal source 50 is modified to provide an alternate test number which is always three less than the first digit of the instructed number. The phase of the anode voltage of the relay discriminator 54 is reversed as indicated in the legend of FIGURE 7. The system prefers to go in the upscale direction unless the position desired in the downscale direction is less than one-eighth to one-third of a revolution of the lowest speed selsyn transformer. Thus, the maximum downscale travel varies from approximately one-third of a revolution of the lowest speed selsyn transformer for numbers whose last digits are zeros to approximately one-eighth of a revolution of the lowest speed selsyn transformer for those numbers whose last digits are all nine.

Several relatively minor modifications would have to be made in the diagram of FIGURE 2(a) to accomplish the second two modes of operation, namely downscale and upscale travel favored. First, the normally open contacts SYR-2 of the synchronizing relay SYR are connected to either an upscale or a downscale signal. Second, the test signal source 50 would be modified to provide a test number which has a value determined by which of the two modes of operation is to be used. When the synchronizing relay SYR is operated, the motor control 38 either always receives an upscale signal for upscale travel favored or always receives a downscale signal for downscale travel favored to provide positioning. When the synchronizing relay SYR is not operating, positioning is provided by the selsyn transformer signals operating through the mixer circuit 30 and the discriminator 34.

In the mode of operation termed upscale direction of travel favored, the test signal source 50 is modified to provide an alternate test number which is always three greater than the first digit of the instructed number. The phase of the anode voltage of the relay discriminator 54 is given in the legend of FIGURE 7. The normally open contacts SYR-2 of the synchronizing relay SYR are permanently connected to a signal source that runs or operates the system in the upscale direction whenever the synchronizing relay is energized. This arrangement has the advantage over the operation of upscale travel by the discriminator signal in that the longest rotational operation in the upscale direction is limited to a maximum of approximately 240°. In this operation, the maximum possible downscale operation is limited to approximately 120°.

In the mode of operation termed downscale direction of travel favored, the test signal source 50 is modified to provide an alternate test number which is always three less than the first digit of the instructed number. In this operation, the phase of the anode voltage of the relay discriminator circuit 54 is reversed as indicated in the legend of FIGURE 7. The normally open contacts SYR-2 of the synchronizing relay SYR are permanently connected to a signal source that runs or operates the system in the downscale direction whenever the synchronizing relay SYR is energized. This arrangement has the advantage over the operation of downscale travel by the discriminator signal in that the longest rotational operation in the downscale direction is limited to a maximum of approximately 240°. The maximum possible upscale operation is limited to approximately 120°.

The arrangements in accordance with the invention can, as will be appreciated by persons skilled in the art, provide many modes of operation and provide a flexible system which can be adapted to the needs of a particular operation. The invention provides improved positioning control which extends the free working zone of positioning beyond those limits imposed by systems utilizing only selsyn transformers. Furthermore, this free working zone is extended without requiring additional selsyn transformers and is brought about by the addition of relatively simple and inexpensive circuit components. While the invention has been described with reference to particular embodiments, it is to be understood that modifications may be made by persons skilled in the art without departing from the spirit of the invention or from the scope of the claims.

What I claim as new and desire to secure by Letters Patent of the United States is:

1. An arrangement for bringing an object within the range of operation of a follow-up control system that has a drive device and that is capable of positioning said object at a point within said range in accordance with a signal from a selsyn device, comprising a source that produces a direction signal having a selectable value, and means for alternatively coupling said drive device to said selsyn device and for coupling said drive device to said direction signal source for determining the operation of said drive device.

2. An arrangement for bringing an object within the range of operation of a follow-up control system that has a drive device and that is capable of positioning said object from one point within said range to another point within said range in accordance with a signal from a selsyn device, comprising a source that produces a direction signal having a plurality of selectable values, a test signal source, means for selectively coupling said test signal source to said selsyn device, and means for alternatively coupling said drive device to said direction signal source in response to certain values of said test signal derived from said selsyn device for causing said drive device to bring said object within said range and for coupling said drive device to said selsyn device in response to certain other values of said test signal derived from said selsyn device for causing said drive device to position said object within said range.

3. An arrangement for bringing an object within the range of operation of a follow-up control system having a selsyn device that is capable of controlling a drive device within said range of operation in accordance with a signal from a first source, comprising a source that produces a direction signal having a plurality of selectable values, first means adapted to be coupled to said selsyn device for deriving a first signal therefrom which varies as a function of the location of said object, means coupled to said first means for comparing said first signal with a reference signal and producing a second signal which varies as a function of said first and said reference signals, and means for alternatively coupling said drive device to said direction signal source in response to certain characteristics of said second signal for causing said drive device to bring said object within said range and for coupling said drive device to said selsyn device in response to certain other characteristics of said second signal for causing said drive device to position said object within said range.

4. An arrangement for bringing an object within the range of operation of a follow-up control system having a selsyn device that controls a drive device for moving said object from a first point within said range to a second point within said range in accordance with a signal applied to said selsyn device, comprising a source that produces a test signal having a plurality of selectable values, means for selectively coupling said test signal source to said selsyn device, means for comparing a test signal derived from said selsyn device with a reference signal and producing a first signal which varies as a function of the relation of said derived test signal and said reference signal, a direction signal source, and means for alternatively coupling said drive device to said direction signal source in response to certain values of said first signal for operating said drive device to bring said object within said range and for coupling said device to said selsyn device in response to certain other values of said first signal for operating said drive device to position said object within said range.

5. An arrangement for bringing an object within the range of operation of a follow-up control system having a drive device and a selsyn device capable of moving said object from some point within said range to a desired point within said range in accordance with a predetermined signal applied to said selsyn device, comprising a source that produces a test signal having a plurality of selectable values dependent upon the desired location of said object, means for selectively coupling said test signal source to said selsyn device, a discriminator circuit adapted to be coupled to said selsyn device for comparing a test signal derived therefrom with the value of a reference signal and producing a discriminator signal which varies as a function of the relative values of said derived test signal and said reference signal, a source that produces a direction signal for determining the direction of operation of said drive device to bring said object within said range, and means responsive to said discriminator circuit for alternatively coupling said drive device to said direction signal source in response to certain values of said discriminator signal so as to bring said object within said range and for coupling said drive device to said selsyn device in response to certain other values of said discriminator signal so as to move said object to said desired location within said range.

6. An arrangement for bringing an object within the range of operation of a follow-up control system comprising a drive device and a plurality of selsyn devices capable of moving said object from some point within said range to a desired point within said range in accordance with predetermined signals applied to said selsyn devices, a source that produces a test signal having a plurality of selectable values dependent upon the desired location of said object, means for selectively coupling said test signal source to one of said selsyn devices, means for selectively decoupling said predetermined signals from said one selsyn device, a discriminator circuit coupled to said one selsyn device for comparing a test signal derived therefrom with the value of a reference signal and producing a discriminator signal which variers as a function of the relative values of said derived test signal and said reference signal, a source that produces a direction signal for determining the direction of operation of said drive device to bring said object within said range, and means coupled to said drive device and responsive to said discriminator circuit for alternatively coupling said drive device to said direction signal source in response to certain values of said discriminator signal so as to bring said object within said range and for coupling said drive device to said selsyn devices in response to certain other values of said discriminator signal so as to move said object to said desired location within said range.

7. An arrangement for bringing an object within the range of operation of a follow-up control system that is capable of positioning said object from a first point within said range to a desired point within said range, said system having a drive device that is operated in accordance with a predetermined signal applied to a selsyn device, comprising a source that produces a test signal having a value dependent upon the desired location of said object, a discriminator circuit for comparing a derived value of said test signal with the value of a reference signal and producing a discriminator signal which varies as a function of the relative values of said derived test signal and said reference signal, means for selectively coupling said test signal source through said selsyn device to said discriminator circuit during the time said object is outside said range, a source that produces a direction signal for operating said drive device so as to bring said object within said range, and means responsive to said discriminator circuit for alternatively coupling said drive device to said direction signal source in response to certain values of said discriminator signal so as to bring said object within said range and for coupling said drive device to said selsyn device in response to certain other values of said discriminator signal so as to move said object to said desired location within said range.

8. An arrangement for bringing an object within the range of operation of a follow-up control system that is capable of positioning said object between points inside said range, said system having a drive device that is operated in accordance with a predetermined signal applied to a selsyn device, comprising a source that produces a test signal that has a value dependent upon the desired location of said object within said range, a discriminator circuit for comparing a derived value of said test signal with the value of a reference signal and producing a discriminator signal which varies as a function of the relative values of said derived test signal and said reference signal, means selectively coupling said test signal source to said discriminator circuit and adapted for simultaneously decoupling said selsyn device from said drive device during the time said object is outside said range and selectively decoupling said test signal source from said discriminator circuit and adapted for simultaneously coupling said selsyn device to said drive device during the time said object is within said range, a source that produces a direction signal for operating said drive device so as to bring said object within said range, and means responsive to said discriminator signal for alternatively coupling said drive device to said direction signal source in response to certain values of said discriminator signal so as to bring said object within said range and for coupling said drive device to said selsyn device in response to certain other values of said discriminator signal so as to move said object to said desired location within said range.

9. An arrangement for bringing an object within the range of operation of a follow-up control system that is capable of positioning said object between points inside said range, said system having a drive device that is operated in accordance with a predetermined signal derived from a selsyn device, comprising a source that produces a test signal that has a value dependent upon the desired location of said object within said range, said test signal being selectively applied to said selsyn device, a discriminator circuit coupled to said selsyn device for comparing the value of said test signal derived from said selsyn device with the value of a reference signal and producing a discriminator signal which varies as a function of the relative values of said derived test signal and said reference signal, means for selectively coupling said test signal source to said selsyn device and adapted for simultaneously decoupling said selsyn device from said drive device during the time said object is outside said range and for selectively decoupling said test signal source from said selsyn device and adapted for simultaneously coupling said selsyn device to said drive device during the time said object is within said range, a source that produces a direction signal for operating said drive device so as to bring said object within said range, and means responsive to said discriminator signal for alternatively coupling said drive device to said direction signal source in response to certain values of said discriminator signal and thereby bring said object within said range and for coupling said drive device to said selsyn device in response to certain other values of said discriminator signal so as to move said object to said desired location within said range.

10. An arrangement for bringing an object within the range of operation of a follow-up control system that is capable of positioning said object between selected points inside said range, said system having a drive device that is operated in accordance with a predetermined signal derived from a selsyn device, comprising a source that produces a test signal that has a value dependent upon the desired location of said object within said range, a discriminator circuit adapted to be coupled to said selsyn device for comparing the derived value of said test signal with the value of a reference signal and producing a discriminator signal which varies as a function of the relative values of said derived test signal and said reference signal, a synchronizing test relay having a winding that is energized in response to a synchronizing relay winding being energized and that is deenergized in response to said synchronizing relay winding being deenergized, said synchronizing relay winding being coupled to said discriminator circuit and being energized in response to certain values of said discriminator signal and being deenergized in response to certain other values of said discriminator signal, first contacts adapted to be coupled between said selsyn device and said drive device, said first contacts being engaged in response to said synchronizing test relay winding being deenergized and being disengaged in response to said synchronizing test relay winding being energized, second contacts adapted to be coupled between said test signal source and said selsyn device, said second contacts being disengaged in response to said synchronizing test relay winding being deenergized and being engaged in response to said synchronizing test relay winding being energized, a source that produces a direction signal for operating said drive device so as to bring object within said range, third contacts adapted to be coupled between said direction signal source and said drive device, said third contacts being disengaged in response to said synchronizing relay winding being deenergized and being engaged in response to said synchronizing relay winding being energized, and fourth contacts adapted to be coupled between said first contacts and said drive device, said fourth contacts being engaged in response to said synchronizing relay winding being deenergized and being disengaged in response to said synchronizing relay winding being energized.

11. An arrangement for bringing an object within the range of operation of a follow-up control system that has a drive device and that has selsyn devices supplied from a voltage source and that is capable of positioning said object from one point within said range to another point within said range in accordance with signals from said selsyn devices, comprising a test signal source, and means for alternatively coupling said drive device through one of said selsyn devices to said test signal source in response to certain derived values of said test signal for causing said drive device to bring said object within said range and for coupling said drive device through said one selsyn device to said voltage source in response to certain other derived values of said test signal for causing said drive device to position said object within said range.

12. An arrangement for bringing an object within the range of operation of a follow-up control system having a selsyn device that controls a drive device for moving said object from a first point within said range to a second point within said range in accordance with a signal from a first source applied to said selsyn device, comprising a source that produces a test signal having a plurality of selectable values, means for comparing a derived test signal with a reference signal and producing a second signal which varies as a function of the relation of said test and said reference signals, and means for alternatively coupling said drive device through said selsyn device to said test signal source in response to certain values of said second signal for operating said drive device to bring said object within said range and for coupling said drive device through said selsyn device to said first signal source in response to certain other values of said first signal for operating said drive device to position said object within said range.

13. An arrangement for bringing an object within the range of operation of a follow-up control system that is capable of positioning said object from a first point within said range to a desired point within said range, said system having a drive device that is operated in accordance with a predetermined signal from a first source which is applied to a selsyn device, comprising a source that produces a test signal having a value dependent upon the desired location of said object, a discriminator circuit for comparing a derived value of said test signal with the value of a reference signal and producing a discriminator signal which varies as a function of the relative values of said derived test signal and said reference signal, means for selectively coupling said test signal source through said selsyn device to said discriminator circuit during the time said object is outside said range, and means responsive to said discriminator circuit for alternatively coupling said drive device through said selsyn device to said test signal source in response to certain values of said discriminator signal so as to bring said object within said range and for coupling said drive device through said selsyn device to said first signal source in response to certain other values of said discriminator signal so as to move said object to said desired location within said range.

References Cited in the file of this patent

UNITED STATES PATENTS

| | | |
|---|---|---|
| 2,661,449 | Gille | Dec. 1, 1953 |
| 2,796,569 | McDonald | June 18, 1957 |
| 2,848,670 | Kelling et al. | Aug. 19, 1958 |
| 2,905,877 | Ciscel | Sept. 22, 1959 |

OTHER REFERENCES

Savant, C. J.: Basic Feedback Control System Design, pages 238–239, McGraw-Hill, New York, 1958.

UNITED STATES PATENT OFFICE
CERTIFICATE OF CORRECTION

May 15, 1962

Patent No. 3,035,214

Leroy U. C. Kelling

It is hereby certified that error appears in the above numbered patent requiring correction and that the said Letters Patent should read as corrected below.

Column 2, line 47, for "operations" read -- operation --; column 5, line 68, for "selectron" read -- electron --; column 13, line 75, after "one-third" insert -- part --; column 15, line 60, after "said", first occurrence, insert -- drive --; column 16, line 27, for "variers" read -- varies --.

Signed and sealed this 28th day of August 1962.

(SEAL)
Attest:

ESTON G. JOHNSON
Attesting Officer

DAVID L. LADD
Commissioner of Patents